United States Patent
Sethi et al.

(10) Patent No.: US 12,309,161 B2
(45) Date of Patent: May 20, 2025

(54) PREDICTION OF SECURITY LEVELS FOR INCOMING DATA

(71) Applicant: Dell Products L.P., Round Rock, TX (US)

(72) Inventors: Parminder Singh Sethi, Ludhiana (IN); Nithish Kote, Bangalore (IN); Thanuja C, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 17/834,599

(22) Filed: Jun. 7, 2022

(65) Prior Publication Data

US 2023/0396630 A1  Dec. 7, 2023

(51) Int. Cl.
*H04L 29/06* (2006.01)
*H04L 9/40* (2022.01)

(52) U.S. Cl.
CPC .................. *H04L 63/105* (2013.01)

(58) Field of Classification Search
CPC .................................................... H04L 63/105
See application file for complete search history.

(56) References Cited

U.S. PATENT DOCUMENTS

| | | | | |
|---|---|---|---|---|
| 5,692,124 A * | 11/1997 | Holden | ...................... | H04L 9/40 707/999.009 |
| 11,575,702 B2 * | 2/2023 | Singh | ...................... | H04L 45/38 |
| 11,803,792 B2 * | 10/2023 | Makhija | .................. | G06Q 10/08 |
| 2014/0289852 A1 * | 9/2014 | Evans | ...................... | G06F 21/55 726/23 |
| 2021/0169417 A1 * | 6/2021 | Burton | .................. | A61B 5/4857 |
| 2022/0224711 A1 * | 7/2022 | Singh | .................. | H04L 63/0236 |
| 2022/0303301 A1 * | 9/2022 | Hubbard | .............. | H04L 63/1441 |
| 2023/0139329 A1 * | 5/2023 | Sivaswamy | ........... | H04L 63/083 726/15 |
| 2023/0153191 A1 * | 5/2023 | Gennetten | ........... | G06F 11/0772 714/57 |
| 2023/0195528 A1 * | 6/2023 | Fargo | .................... | G06F 9/5077 718/104 |
| 2023/0328104 A1 * | 10/2023 | Ghosh | ...................... | H04L 63/20 726/23 |

OTHER PUBLICATIONS

A. Hu, "What is the VMware ESXi Server andits Role in the VMware Suite?" https://www.parallels.com/blogs/ras/vmware-esxi/, Sep. 13, 2021, 5 pages.
Wikipedia, "Data Center," https://en.wikipedia.org/wiki/Data_center, May 13, 2022, 22 pages.

(Continued)

*Primary Examiner* — Mahfuzur Rahman
(74) *Attorney, Agent, or Firm* — Ryan, Mason & Lewis, LLP

(57) ABSTRACT

Techniques for management of data security are disclosed. For example, a method comprises collecting data from one or more devices, and predicting security levels of respective portions of the data using one or more machine learning algorithms. In the method, security configurations for a subset of the respective portions of the data are implemented based, at least in part, on corresponding predicted security levels of the subset of the respective portions.

20 Claims, 13 Drawing Sheets

(56) References Cited

OTHER PUBLICATIONS

D. Epping, "VMware vSphere APIs for I/O Filtering (VAIO)" https://core.vmware.com/resource/vmware-vsphere-apis-io-filtering-vaio#section1, Aug. 13, 2020, 11 pages.
Dell EMC, "Dell EMC SupportAssist Enterprise 2.x—Guide and Download," https://www.dell.com/support/kbdoc/en-us/000179530/dell-emc-supportassist-enterprise-2-x-guide-and-download, Jul. 13, 2021, 10 pages.
A. Samoylenko, "VMware vSphere APIs for I/O Filtering (VAIO)—How Does it Work?" https://www.starwindsoftware.com/blog/vmware-vsphere-apis-for-io-filtering-vaio, Nov. 8, 2017, 6 pages.

* cited by examiner

300

```
{
  "file Size" : 50MB,
  "type": txt,
  "lastModified": 23/1/2022,
  "predictedUseabilityFrequency": 1 in 15 days,
}
```

```
{
"fileSize": 50MB,
"type": txt,
"lastModified": 23/1/2022,
"predictedUseabilityFrequency": 1 in 15 days,
"isEsclationNeeded": yes,
"dataPosition": [x-y, z-m],
"securityFold": 5x
}
```

```
UUID
{
"file size" : 1KB
"type" : txt
"last modified" : 1/24/2022
"Modified frequency" : 6 days
"Is Escalation needed" : YES
"SecurityFold" : 5x
}
```

FIG. 9

| DATA TEXT | CRITICAL (1) or NON-CRITICAL (0) |
|---|---|
| Your account number is 1234567890 and OTP is 9876. | 1 |
| The ATM PIN is 3456. Contact us with any questions. | 1 |
| Guaranteed to lose 10 - 12 lbs in 30 days. | 0 |
| Claim your free $100 gift card. | 0 |
| Salary of $5,678.88 is credited to your account 9876543210 | 1 |
| Order Confirmed: Order# 54192693 will be ready for pick up on 12/12/21 | 1 |
| Tired of your high mortgage rate? - Refinance Today | 0 |

FIG. 10

PREDICTION OF SECURITY LEVELS FOR INCOMING DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to data management in such information processing systems.

BACKGROUND

Data security includes practices, policies and principles to protect digital data from access by unauthorized parties. There are various methods used to protect data such as, but not necessarily limited to, encryption, firewalls and/or authentication and authorization protocols. Processes for securing data may utilize large amounts of compute resources and bandwidth, and can result in network bottlenecks.

Datacenters may include thousands to tens of thousands of devices spread across multiple locations in, for example, different buildings and geographic regions. The datacenter devices may include large volumes of data (e.g., gigabytes and terabytes) that need to be secured. However, the security needs may vary depending on the type of data.

SUMMARY

Embodiments provide a data security management platform in an information processing system.

For example, in one embodiment, a method comprises collecting data from one or more devices, and predicting security levels of respective portions of the data using one or more machine learning algorithms. In the method, security configurations for a subset of the respective portions of the data are implemented based, at least in part, on corresponding predicted security levels of the subset of the respective portions.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts an example JavaScript Object Notation (JSON) file comprising parameters of collected data in an illustrative embodiment.

FIG. 7 depicts updating of the JSON file of FIG. 3 with data security parameters in an illustrative embodiment.

FIG. 8 depicts example pseudocode for the operation of the security level prediction engine in an illustrative embodiment.

FIG. 9 depicts a JSON file with data security parameters in an illustrative embodiment.

FIG. 10 depicts a table comprising critical and non-critical data in an illustrative embodiment.

DETAILED DESCRIPTION

Figure 1:
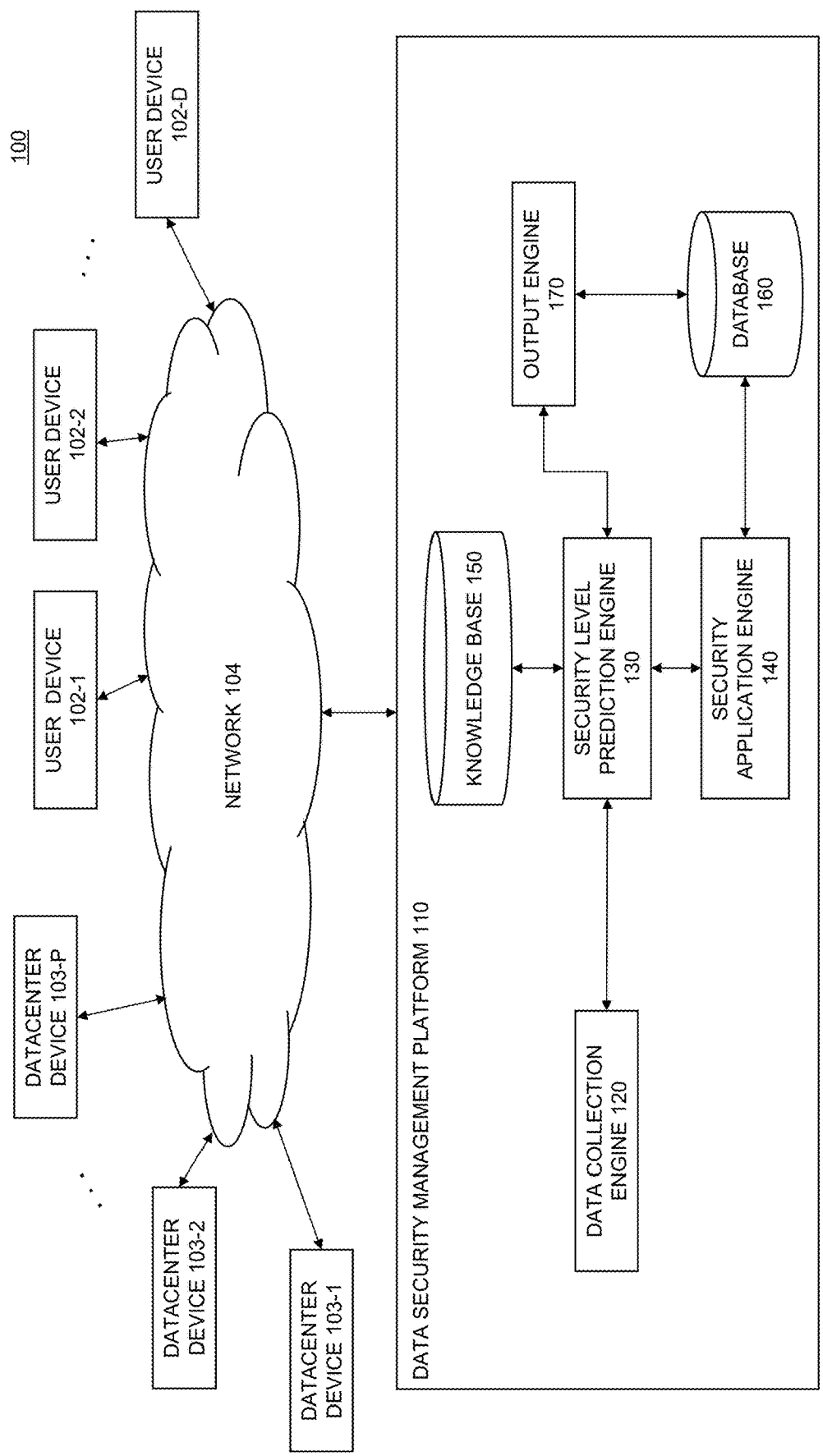
FIG. 1 depicts an information processing system with a data security management platform for predicting security levels of data in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "component" is to be broadly construed, and can refer to various parts, hardware components and/or software components such as, but not necessarily limited to, storage devices (e.g., hard disk drives), batteries, chassis, display panels, motherboards, central processing units (CPUs), controllers, cards, heat sinks, fans, fan assemblies, processors, ports, port connectors, host bus adaptors (HBAs), speakers, keyboards, memories, servers, switches, sensors, buses (e.g., serial buses), networks or other elements of a computing environment.

FIG. 1 shows an information processing system 100 configured in accordance with an illustrative embodiment. The information processing system 100 comprises user devices 102-1, 102-2, . . . 102-D (collectively "user devices 102") and datacenter devices 103-1, 103-2, . . . 103-P (collectively "datacenter devices 103"). The user devices 102 and datacenter devices 103 communicate over a network 104 with a data security management platform 110. The variables D and P and other similar index variables herein such as K, L, M and N are assumed to be arbitrary positive integers greater than or equal to one.

The user devices 102 and datacenter devices 103 can comprise, for example, desktop, laptop or tablet computers, servers, host devices, storage devices, mobile telephones, Internet of Things (IoT) devices or other types of processing devices capable of communicating with the data security management platform 110 over the network 104. Such devices are examples of what are more generally referred to herein as "processing devices." Some of these processing devices are also generally referred to herein as "computers." The user devices 102 and datacenter devices 103 may also or alternately comprise virtualized computing resources, such as virtual machines (VMs), containers, etc. The user devices 102 and/or datacenter devices 103 in some embodiments comprise respective computers associated with a particular company, organization or other enterprise. It is to be understood that although the embodiments are discussed in terms of user devices 102 (e.g., customer or client devices) and datacenter devices 103, the embodiments are not necessarily limited thereto, and may be applied to different devices (e.g., edge or cloud devices).

The terms "user" or "administrator" herein are intended to be broadly construed so as to encompass numerous arrangements of human, hardware, software or firmware entities, as well as combinations of such entities. Data security management services may be provided for users utilizing one or more machine learning models, although it is to be appreciated that other types of infrastructure arrangements could be used. At least a portion of the available services and functionalities provided by the data security management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the data security management platform 110, as well as to support communication between the data security management platform 110 and connected devices (e.g., user devices 102 and datacenter devices 103) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the data security management platform 110.

Methods to encrypt the data may include using certificate keys (e.g., public and private keys) to encrypt the data. Similarly, there are decryption methods to retrieve the data with valid decryption keys. A datacenter may include large datasets (e.g., terabytes or greater). The amount of processing, memory, handshaking, payload, etc. in connection with security management of the large datasets is very high, whether the data is at rest or in transit.

Depending on the type of data in the datasets, security may be critical or not critical. For example, data including device level information of different user devices 102 or datacenter devices 103 (e.g., universally unique identifiers (UUIDs) or other identifiers), as well as data relating to personal, health, financial or other sensitive information of users, enterprises, organizations or other entities may be considered critical and in need of high security. Data relating to, for example, the number of components in a device (e.g., number of fans), general communications (e.g., mass emails, advertisements, offers, etc.) or other non-sensitive information may be considered non-critical and require low or no security.

Current approaches to data security management do not analyze data to assess which portions of the data require increased security relative to other portions. As a result, compute resources are wasted by applying blanket security protocols to blocks of data, when only part of the data requires higher security configurations. The embodiments advantageously provide technical solutions which use machine learning techniques to analyze different portions of data to determine the levels of security required by each portion, and only apply security protocols to the data portions requiring enhanced security.

For example, in a non-limiting illustrative embodiment, out of a 1 GB dataset, 10 MB may require escalated levels of security, while the rest of the data may require normal security levels. In one illustrative embodiment, a Random Forest machine learning algorithm is used to analyze datasets from one or more datacenter or user devices 103 or 102, and predict the security levels of portions of the datasets. As all the data is not equally critical, security level prediction is performed on a complete dataset, but the security configurations of only parts of the complete dataset will be implemented (e.g., adjusted), saving valuable compute resources. Additionally, the security implementations are configurable at any point in time to enable real-time adjustments responsive to newly received data.

The data security management platform 110 in the present embodiment is assumed to be accessible to the user devices 102 and datacenter devices 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Figure 2:
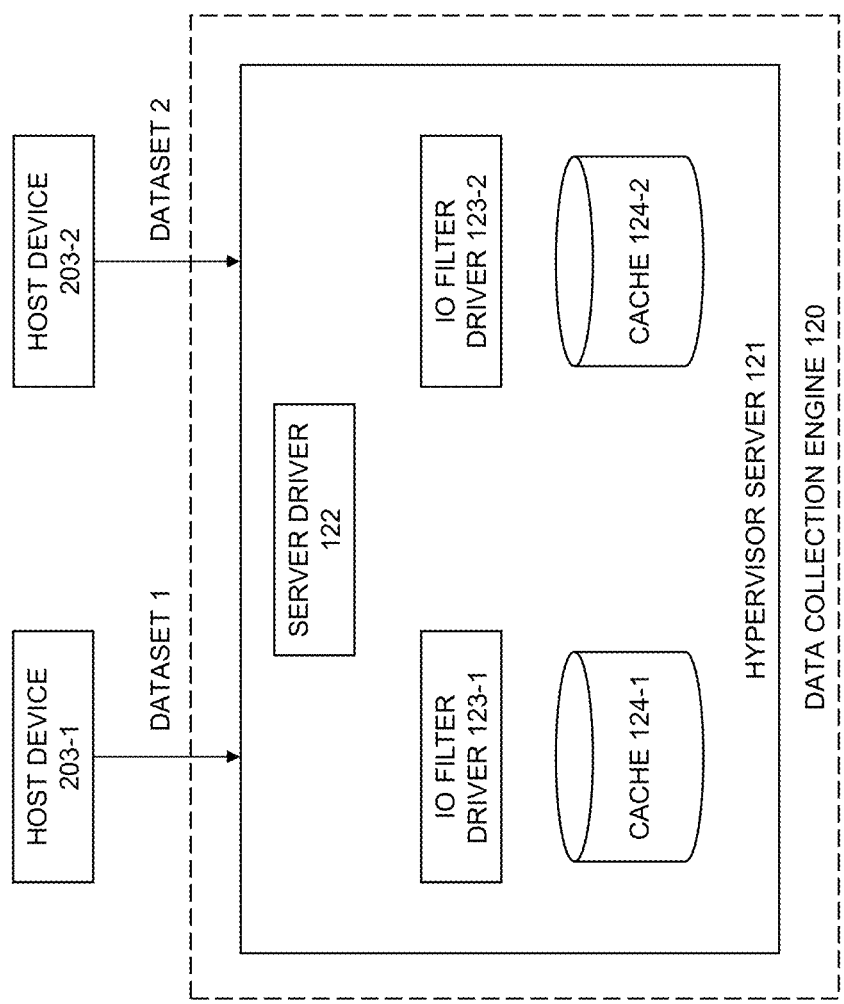
FIG. 2 depicts a data collection engine of a data security management platform in an illustrative embodiment.

Referring to FIG. 1, the data security management platform 110 includes a data collection engine 120, a security level prediction engine 130, a security application engine 140, a knowledge base 150, a database 160 and an output engine 170. Referring to FIG. 2, in an illustrative embodiment, the data collection engine 120 comprises a hypervisor server 121 including a server driver 122, one or more input-output (IO) filter drivers (e.g., IO filter driver 123-1 and IO filter driver 123-2) and one or more caches (e.g., cache 124-1 and cache 124-2). The data collection engine 120 receives incoming data from user and/or datacenter devices 102, 103. The data can be collected using one or more data collection applications such as, but not necessarily limited to, like SupportAssist Enterprise available from Dell Technologies. The collected data may be stored in the caches 124 and in the database 160.

As shown in FIG. 2, the datasets (e.g., dataset 1 and dataset 2) may originate from one or more host devices (e.g., host devices 203-1 and host device 203-2). The host devices 203 may correspond to one or more datacenter devices 103 and/or one or more user devices 102. According to one or more embodiments, the collecting of the data by the data collection engine 120 comprises intercepting one or more IO requests from the host devices 203. The IO requests comprise respective portions of the data from, for example, dataset 1 and dataset 2. The intercepting is executed in a virtualized environment (e.g., hypervisor server 121) using the IO filter drivers 123.

For example, the incoming data from the datasets 1 and 2 is trapped in a hypervisor server 121 (e.g., an ESXi server) using, for example, application programming interfaces (APIs) for IO filtering available via the IO filter drivers 123. A non-limiting example of an API for IO filtering is a vSphere API for IO Filtering (VAIO), which is used to intercept IO requests from a guest operating system (GOS) to a virtual machine disk (VMDK). In illustrative embodiments, the incoming data from the host devices 203 is trapped using a VAIO software development kit (SDK).

The data collection engine 120 generates a plurality of JavaScript Object Notation (JSON) files (more generally referred to herein as data object-based files) corresponding to the respective portions of the data from the datasets 1 and 2. The plurality of JSON files specify one or more parameters of the respective portions of the data, such as, for example, file size, data type, last modification details and frequency of usage of the respective portions of the data. For example, referring to the example JSON file 300 in FIG. 3, a file size ("fileSize") for a portion of a dataset is 50 MB, the data type ("type") is text ("txt"), the last modified date ("lastModified") is Jan. 23, 2022 and a predicted frequency of usage of the data portion ("predictedUseabilityFrequency") is 1 time in 15 days. The plurality of JSON files can be stored in caches 124. As explained in more detail herein, the plurality of JSON files are provided to the security level prediction engine 130, and are updated by the security level prediction engine 130 based on the security level predictions. As can be understood, the data collected by the data collection engine 120 is not equally critical and different portions of the data may correspond to different security levels. For example, dataset 1 may comprise critical data and dataset 2 may comprise non-critical data. However, the embodiments are not necessarily limited thereto, as datasets 1 and 2 may each comprise critical and non-critical data portions.

Figure 4:
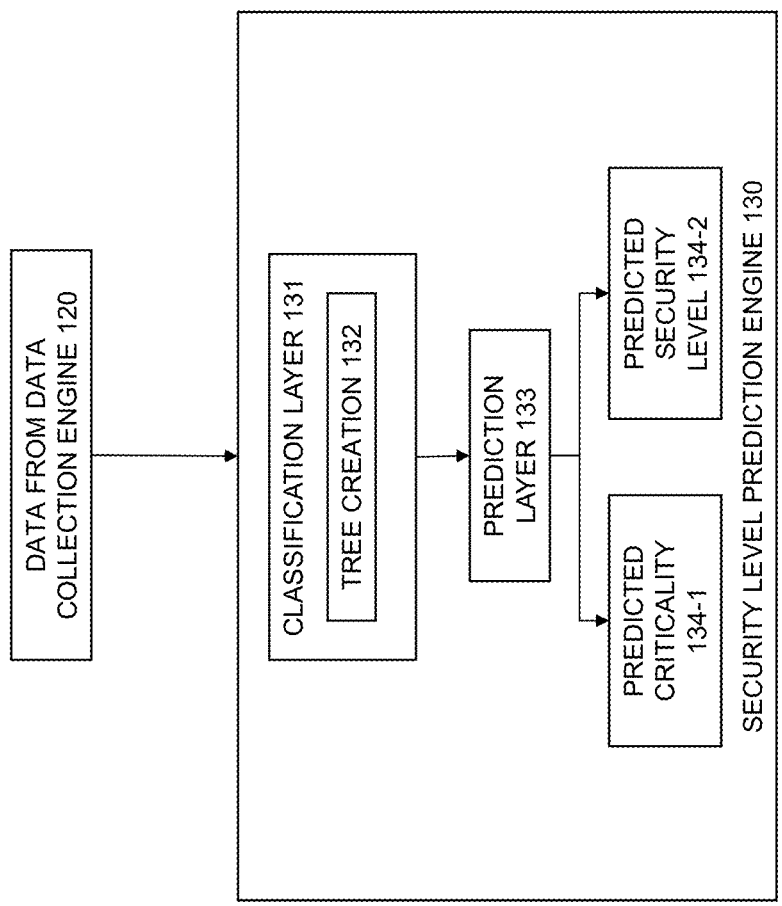
FIG. 4 depicts a security level prediction engine of a data security management platform in an illustrative embodiment.

Referring to FIG. 4, the security level prediction engine 130 comprises a classification layer 131 and a prediction layer 133. The classification layer 131 comprises a tree creation module 132 which, as explained in more detail herein below, creates a plurality of decision trees in connection with a Random Forest machine learning algorithm. The prediction layer 133 generates outputs comprising, for example, a predicted criticality 134-1 of the respective data portions and a predicted security level 134-2 of the respective data portions. The security level prediction engine 130 receives data from the data collection engine 120, which includes the portions of the collected datasets and their corresponding JSON files.

In more detail, the classification layer 131 utilizes a Random Forest machine learning algorithm, which uses a large collection of decorrelated decision trees. The tree creation module 132 creates multiple decision trees and the prediction layer 133 uses the decision trees to predict whether the data portions are critical (e.g., requiring security) or non-critical (not requiring security). If the predicted criticality 134-1 is "critical," then the prediction layer 133 further predicts a number of security levels (also referred to herein as "security folds") that should be applied to the data portions. For example, the predicted security level 134-2 is based on a prediction of how critical the data portions are relative to other data portions. Higher security levels correspond to more layers (e.g., folds) of security. For example, if a first data portion is predicted by the prediction layer 133 to be more critical than a second data portion, the first data portion will correspond to a higher level of security (e.g., more security layers) than the second data portion.

As used herein, "security layers," "security folds" or "layers of security" are to be broadly construed to refer to, for example, a plurality of data security methods, where each layer or fold represents one of the security methods. Defensive layers may support each other, such that if one layer fails, the next layer provides a backup level of protection before the data can be accessed. The more layers protecting the data, the safer the data. Layers may comprise, but are not necessarily limited to, firewalls, encryption levels, authentication requirements, authorization levels, secure networks, limitations on application access to the data and other data access restrictions.

As explained in more detail herein below, the security application engine 140 implements the security configurations of the data portions based on their predicted security levels. If the predicted criticality 134-1 of a given data portion is "non-critical," the security configuration of the given data portion does not need to be implemented or adjusted.

In an illustrative embodiment, the prediction layer 133 uses the machine learning algorithm to predict whether respective portions of the data meet a learned criticality criteria. For example, the machine learning algorithm is trained to determine criticality based, at least in part, on training data illustrating critical and non-critical data. Referring to the table 1000 in FIG. 10, sample training data is labeled as critical or non-critical. The table 1000 can also reference test data, in which case the machine learning algorithm has determined whether certain data portions are critical or non-critical. As shown in the table 1000, data portions corresponding to, for example, salary, one-time passcodes (OTPs), account numbers, personal identification numbers (PINs) and order confirmations are critical (1). Data portions corresponding to, for example, advertisements and offers are non-critical (0). The training data and/or test data may be provided to the security level prediction engine 130 from the knowledge base 150.

Figure 5:
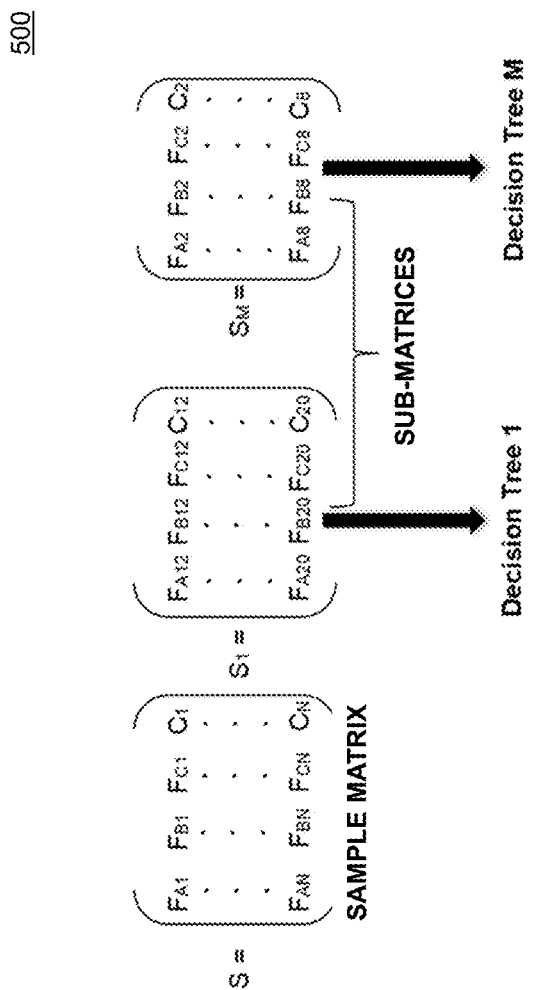
FIG. 5 depicts an operational flow for the generation of decision trees in connection with the development of a Random Forest algorithm for predicting criticality and data security levels in an illustrative embodiment.

Referring to the operational flow 500 in FIG. 5, in connection with the operation of the classification layer 131 and the tree creation module 132, S refers to a matrix of training samples. The matrix of training samples may be provided to the security level prediction engine 130 from the knowledge base 150. From the sample matrix S, a plurality of sub-matrices (i.e., $S_1, S_2 \ldots S_M$) are created, and these sub-matrices are fed to the Random Forest algorithm to create a plurality of decision trees. Here $F_{A1}$, $F_{B1}$, $F_{C1}$ are different datasets from different devices (e.g., devices 102 and 103), and $C_1 \ldots C_N$ refer to different training classes (e.g., criticality and security level (number of security layers/folds)). From each sub-matrix, a plurality of decision trees (Decision Tree 1 . . . Decision Tree M) are created. From these different variations of the main classification, all or many of the decision trees (Decision Tree 1 . . . Decision Tree M) are used to create a prediction configuration used by the prediction layer 133 to generate the predictions 134-1 and 134-2.

Figure 6:
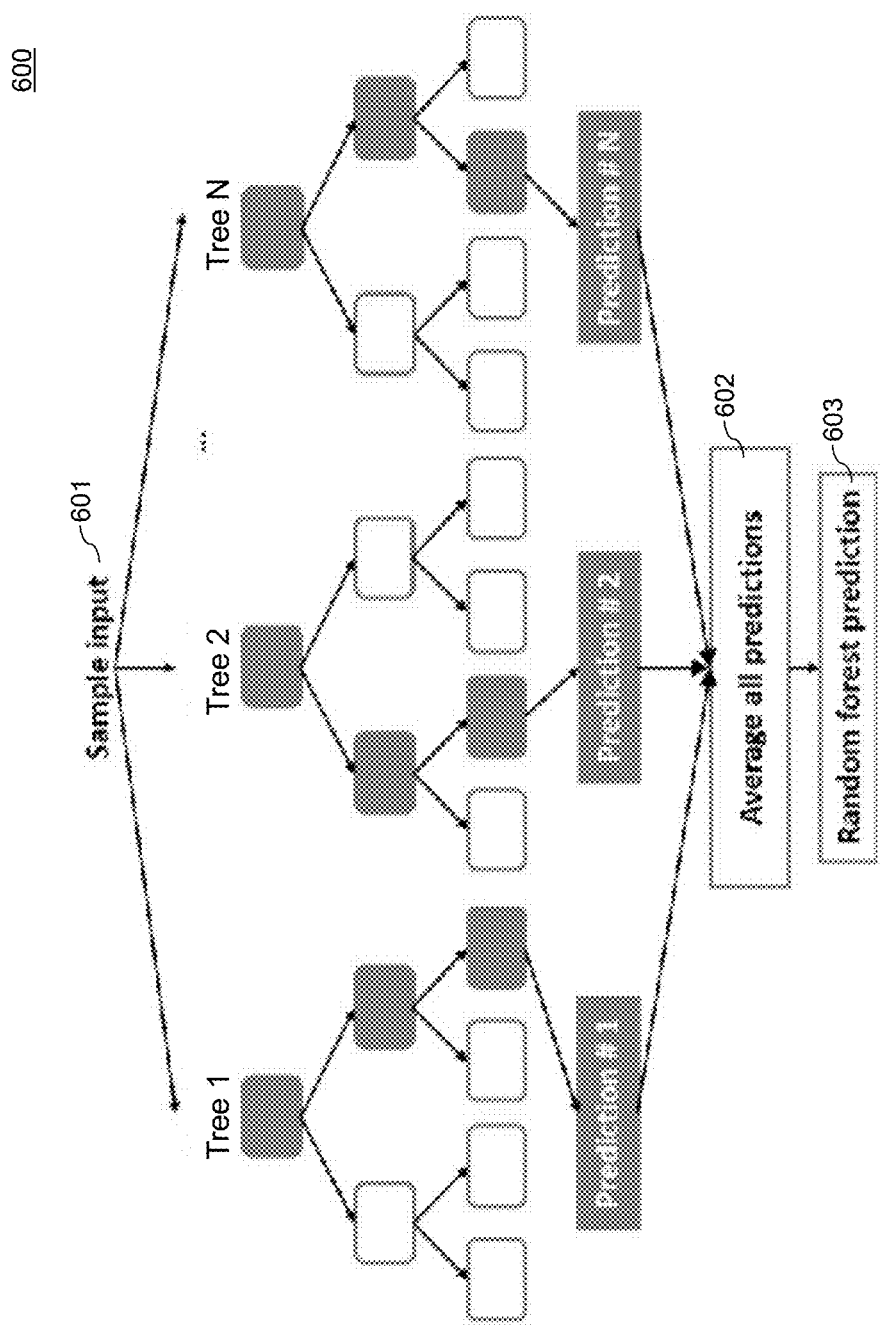
FIG. 6 depicts an operational flow through multiple decision trees for predicting criticality and data security levels in an illustrative embodiment.

For example, referring to the operational flow 600 in FIG. 6, given a sample data portion ("sample input 601"), a plurality of decision trees (Tree 1, Tree 2, . . . Tree N) are used by the prediction layer 133 to predict criticality (134-1) and/or data security level (134-2) for each data portion. As can be seen in FIG. 6, respective predicted criticalities and/or security levels (Prediction #1, Prediction #2, . . . Prediction #N) from respective ones of the plurality of decision trees (Tree 1, Tree 2, . . . Tree N) are averaged at block 602 and an overall predicted criticality and/or security level is generated for the sample data portion at block 603.

As noted herein, the predicted security levels correspond to numbers of security layers. For example, the predicted security level corresponds to how critical a data portion is determined to be. In illustrative embodiments, the predicted security level, which may be based on data received in real-time, comprises an indication of the number of layers of security (e.g., security folds) for a given data portion (e.g., 2 folds, 4 folds, 10 folds, 50 folds, 100 folds, etc.).

Referring, for example, to FIGS. 7 and 9, once the security level prediction engine 130 predicts the criticality and security levels associated with respective data portions, the security level prediction engine 130 updates the JSON files corresponding to respective data portions with data security parameters corresponding to predicted security levels of the respective data portions, locations of the respective data portions, and whether the respective portions of the data are predicted as critical. For example, the updated JSON file 700, which is an update of the JSON file 300 from FIG. 3, indicates that the corresponding data portion is predicted as critical ("isEscalationNeeded": yes), a location of the data portion on an array ("dataPosition": [x-y, z-m]) and a predicted security level of the data portion ("securityFold": 5×) (e.g., 5 layers of security). In connection with the location of the data portion, in a non-limiting example, out of 1000 lines of data, there are may be only 20 lines that have critical data (or more critical data than other data portions). The indication of data position indicates the coordinates of a data portion on an array comprising multiple data portion positions. As a result, security protocols (e.g., encryption and decryption) are limited to critical data identified by position.

Like the JSON files 300 and 700, the JSON file 900 in FIG. 9 indicates a file size ("file Size": 1 KB) for a portion of a dataset, the text data type ("type": txt), a last modified date ("last modified": Jan. 24, 2022), a modified frequency of usage of the data portion ("Modified frequency": 6 days), that the data portion is predicted as critical ("is Escalation needed": Yes) and a predicted security level of the data portion ("securityFold": 5×). The updated JSON files are provided to the security application engine 140, which applies security configurations to the data portions based on their predicted security levels, and whether the data portion is predicted as critical.

FIG. 8 depicts example pseudocode 800 for the operation of the security level prediction engine. The pseudocode 800 includes directives for splitting data into test and training data, creating a random forest with a specified number of decision trees, training the machine learning model and testing the machine learning model to determine its accuracy.

As noted above, the security application engine 140 applies security configurations to the data portions based on their predicted security levels, and whether the data portion is predicted as critical. The critical data portions to which the security configurations are applied are stored in the database 160 of the data security management platform 110, which can be, for example, a backend database. In addition, an output engine 170 outputs the data portions with the applied security configurations to, for example, the datacenter devices 103 and/or user devices 102 as needed.

According to one or more embodiments, once the security application engine 140 receives the updated JSON files and the data portions, the security application engine 140 compares the received data portions to data portions in the database 160 whose security configurations have been previously implemented, and determines that one or more of the received data portions are similar to one or more of the data portions in the database 160. The implementation of the security configurations of the similar received data portions conforms to how the security configurations were implemented for the one or more of the data portions in the database 160. In other words, the security application engine 140 searches the database 160 to find similar types of past security configuration implementations. In some embodiments, the security application engine 140 applies the same number of security levels in the same manner to the received data portions determined to be similar to the data portions in the database 160.

Once the security levels (e.g., number of security layers/folds) for the data portions are identified by the security application engine 140, the security application engine 140 applies the security configurations (e.g., firewalls, encryption levels, authentication requirements, authorization levels, secure networks, limitations on application access to the data and other data access restrictions) to the data portions determined to be critical. For example, the security application engine 140 applies a requisite number of security of layers based on the predicted security level. In one or more embodiments, the data portions are returned to the security level prediction engine 130, which re-analyzes the data portions to determine whether the predicted security levels and/or implemented configurations are sufficient to secure the data portions.

In one or more embodiments, if the security application engine 140 searches the database 160 and does not find similar types of past security configuration implementations, the security application engine 140 may apply a default security level (e.g., average of a range of security levels) and/or a default security configuration of different types of security layers. The configured data portions using the default settings may also be returned to the security level prediction engine 130 for re-analysis of the data portions to determine whether the security levels and/or configurations are sufficient to secure the data portions. If the security level prediction engine 130 determines that the security levels and/or configurations are not sufficient to secure the data portions, the security level prediction engine 130 increases the security levels until the corresponding data portions are determined to be secure. Once the data portions are determined to be secure, the data portions can be output by the output engine 170 to, for example, one or more of the devices 102 or 103.

According to one or more embodiments, the knowledge base 150, the database 160, caches 124 and other data repositories or databases referred to herein can be configured according to a relational database management system (RDBMS) (e.g., PostgreSQL). In some embodiments, the knowledge base 150, the database 160, caches 124 and other data repositories or databases referred to herein are implemented using one or more storage systems or devices associated with the data security management platform 110. In some embodiments, one or more of the storage systems utilized to implement the knowledge base 150, the database 160, caches 124 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the data security management platform 110, the data collection engine 120, security level prediction engine 130, security application engine 140, knowledge base 150, database 160 and/or output engine 170 in other embodiments can be implemented at least in part externally to the data security management platform 110, for example, as stand-alone servers, sets of servers or other types of systems coupled to the network 104. For example, the data collection engine 120, security level prediction engine 130, security application engine 140, knowledge base 150, database 160 and/or output engine 170 may be provided as cloud services accessible by the data security management platform 110.

The data collection engine 120, security level prediction engine 130, security application engine 140, knowledge base 150, database 160 and/or output engine 170 in the FIG. 1 embodiment are each assumed to be implemented using at least one processing device. Each such processing device generally comprises at least one processor and an associated memory, and implements one or more functional modules for controlling certain features of the data collection engine 120, security level prediction engine 130, security application engine 140, knowledge base 150, database 160 and/or output engine 170.

At least portions of the data security management platform 110 and the elements thereof may be implemented at least in part in the form of software that is stored in memory and executed by a processor. The data security management platform 110 and the elements thereof comprise further hardware and software required for running the data security management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, security level prediction engine 130, security application engine 140, knowledge base 150, database 160, output engine 170 and other elements of the data security management platform 110 in the present embodiment are shown as part of the data security management platform 110, at least a portion of the data collection engine 120, security level prediction engine 130, security application engine 140, knowledge base 150, database 160, output engine 170 and other elements of the data security management platform 110 in other embodiments may be implemented on one or more other processing platforms that are accessible to the data security management platform 110 over one or more networks. Such elements can each be implemented at least in part within another system element or at least in part utilizing one or more stand-alone elements coupled to the network 104.

It is assumed that the data security management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, security level prediction engine 130, security application engine 140, knowledge base 150, database 160, output engine 170 and other elements of the data security management platform 110, and the elements thereof can each be implemented in the form of one or more LXCs running on one or more VMs. Other arrangements of one or more processing devices of a processing platform can be used to implement the data collection engine 120, security level prediction engine 130, security application engine 140, knowledge base 150, database 160 and output engine 170, as well as other elements of the data security management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the data security management platform 110 to reside in different data centers. Numerous other distributed implementations of the data security management platform 110 are possible.

Accordingly, one or each of the data collection engine 120, security level prediction engine 130, security application engine 140, knowledge base 150, database 160, output engine 170 and other elements of the data security management platform 110 can each be implemented in a distributed manner so as to comprise a plurality of distributed elements implemented on respective ones of a plurality of compute nodes of the data security management platform 110.

It is to be appreciated that these and other features of illustrative embodiments are presented by way of example only, and should not be construed as limiting in any way. Accordingly, different numbers, types and arrangements of system elements such as the data collection engine 120, security level prediction engine 130, security application engine 140, knowledge base 150, database 160, output engine 170 and other elements of the data security management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the data security management platform can be offered to cloud infrastructure customers or other users as part of FaaS, CaaS and/or PaaS offerings.

Figure 11:
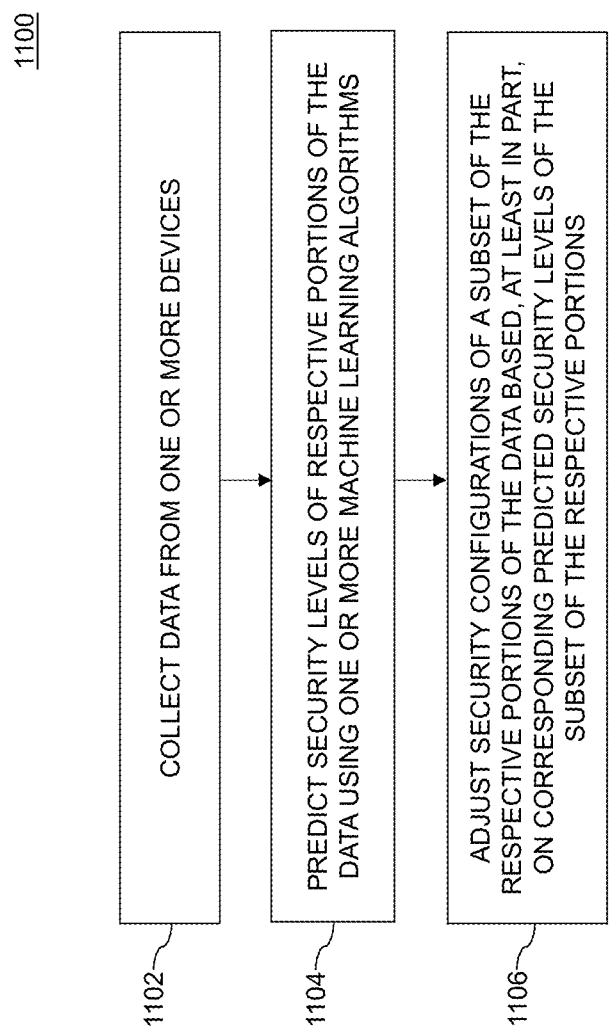
FIG. 11 depicts a process for data security management according to an illustrative embodiment.

The operation of the information processing system 100 will now be described in further detail with reference to the flow diagram of FIG. 11. With reference to FIG. 11, a process 1100 for data security management based on predicted security levels as shown includes steps 1102 through 1106, and is suitable for use in the system 100 but is more generally applicable to other types of information processing systems comprising a data security management platform configured for data security management.

In step 1102, data is collected from one or more devices. In illustrative embodiments, the collecting of the data comprises intercepting one or more IO requests comprising the respective portions of the data, wherein the intercepting is executed in a virtualized environment, and is performed using one or more IO filters. The virtualized environment may comprise an ESXi server (more generally referred to herein as a hypervisor server).

In step 1104, security levels of respective portions of the data are predicted using one or more machine learning algorithms. In one or more embodiments, the predicted security levels indicate numbers of security layers. The one or more machine learning algorithms comprise a Random Forest machine learning algorithm, wherein the predicting of the security levels of the respective portions of the data is performed using a plurality of decision trees. Respective predicted security levels of respective ones of the plurality of decision trees are averaged.

In step 1106, security configurations for a subset of the respective portions of the data are implemented based, at least in part, on corresponding predicted security levels of the subset of the respective portions. In some embodiments, the implementing of security configurations comprises increasing a number of security layers for the respective portions of the data in the subset. The respective portions of the data in the subset meet a learned criticality criteria.

In one or more embodiments, a plurality of JSON files corresponding to the respective portions of the data are generated. The plurality of JSON files specify one or more parameters of the respective portions of the data. The one or more parameters comprise at least one of file size, data type, last modification details and frequency of usage of the respective portions of the data. Following prediction of the security levels, the plurality of JSON files are updated to further specify one or more additional parameters indicating at least one of the predicted security levels of the respective portions of the data, locations of the respective portions of the data, and whether the respective portions of the data belong to the subset. The locations of the respective portions of the data correspond to positions of the respective portions of the data on an array.

In illustrative embodiments, the subset of the respective portions of the data is compared to data portions whose security configurations have been previously implemented, and a determination is made that one or more of the respective portions of the data in the subset are similar to one or more of the data portions whose security configurations have been previously implemented. The implementation of the security configurations of the one or more of the respective portions of the data in the subset is based, at least in part, on the previous implementation of the one or more data portions.

It is to be appreciated that the FIG. 11 process and other features and functionality described above can be adapted for use with other types of information systems configured to execute data security management services in a data security management platform or other type of platform.

The particular processing operations and other system functionality described in conjunction with the flow diagram of FIG. 11 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a data security management platform as disclosed herein can provide a number of significant advantages relative to conventional arrangements. For example, the data security management platform effectively uses machine learning techniques to predict security needs of different types of data. As an additional advantage, the embodiments provide techniques for limiting application of security protocols to data requiring enhanced security, while avoiding unnecessary application of security initiatives to data that does not require security or requires less security. As a result, the embodiments enable more efficient use of compute resources, improve performance and reduce bottlenecks.

For example, certain types of data such as data specifying the number of device components and outdated log files are not critical, and may not require security protocols. On the other hand, data including UUIDs, financial reports, business policies and details about ongoing operations is critical, and requires security measures. The embodiments advantageously use machine learning algorithms to evaluate the data and predict the security needs of the data. Unlike conventional techniques, the embodiments distinguish between data portions that need security and data portions for which security protocols can be omitted or provided in reduced fashion.

Given that datacenters may include thousands to tens of thousands of devices and large volumes of data, the techniques of the embodiments to decipher and apply different security requirements to different types of data advantageously improve efficiency of computing operations and access to data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the data security management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data security management platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
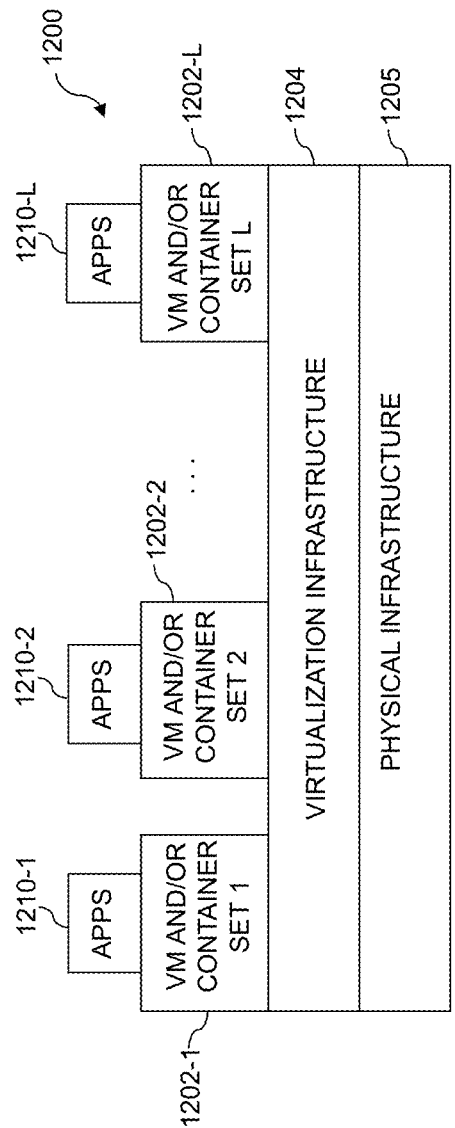
FIGS. 12 and 13 show examples of processing platforms that may be utilized to implement at least a portion of an information processing system according to illustrative embodiments.
Figure 13:
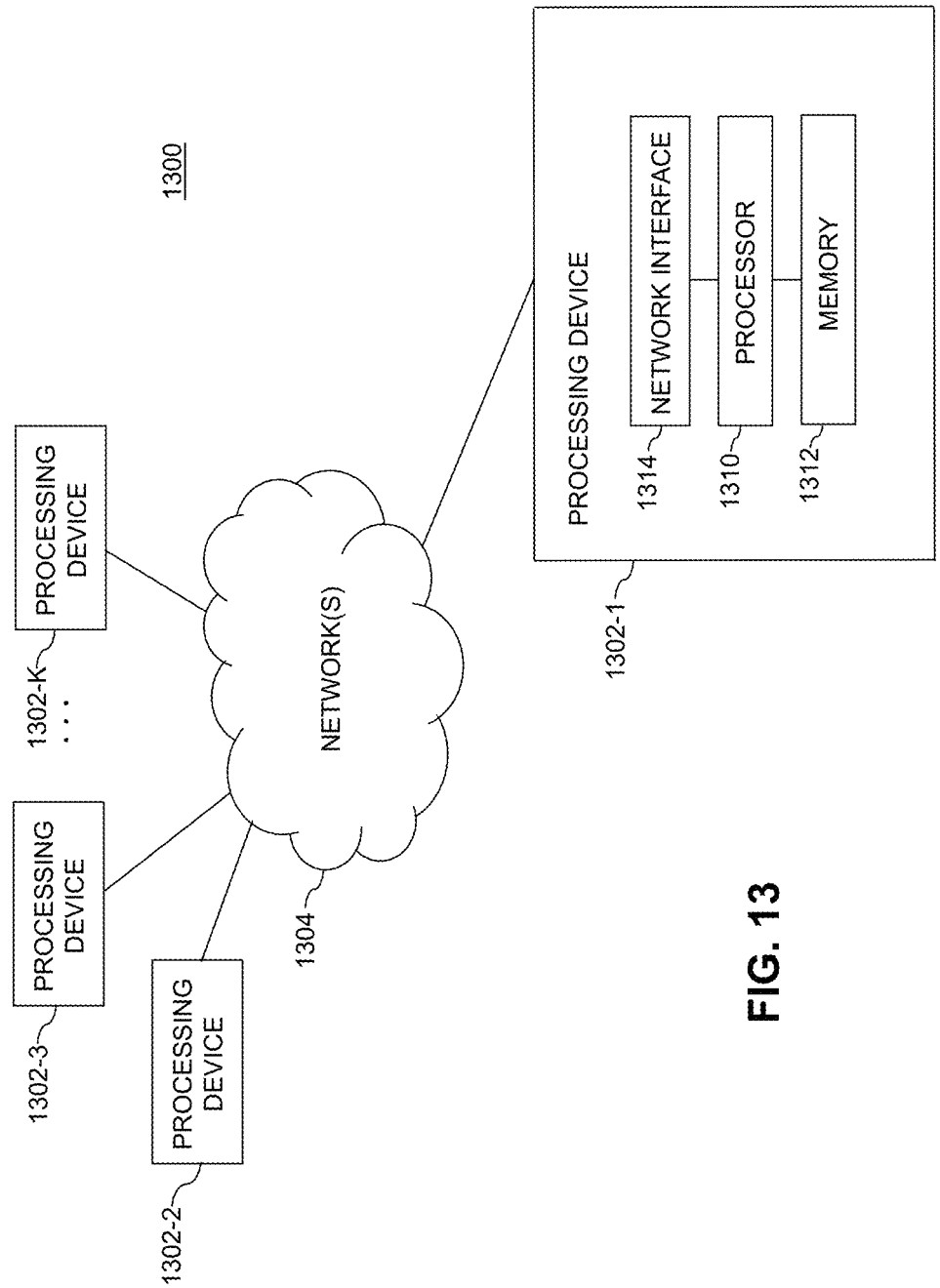

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the data security management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and data security management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   collecting data from one or more devices;
   generating a plurality of data object-based files corresponding to respective portions of the data, the plurality of data object-based files specifying one or more parameters of the respective portions of the data;
   predicting security levels of the respective portions of the data using one or more machine learning algorithms;
   updating the plurality of data object-based files to further specify one or more additional parameters of the respective portions of the data, wherein at least one additional parameter of the one or more additional parameters indicates the predicted security levels of the respective portions of the data; and
   implementing security configurations for a subset of the respective portions of the data based, at least in part, on corresponding predicted security levels of the subset of the respective portions;
   wherein the steps of the method are executed by a processing device operatively coupled to a memory.

2. The method of claim 1 wherein the one or more parameters comprise at least one of file size, data type, last modification details and frequency of usage of the respective portions of the data.

3. The method of claim 1 wherein the one or more additional parameters further indicate at least one of locations of the respective portions of the data and whether the respective portions of the data belong to the subset.

4. The method of claim 3 wherein the predicted security levels indicate numbers of security layers.

5. The method of claim 3 wherein the locations of the respective portions of the data correspond to positions of the respective portions of the data on an array.

6. The method of claim 1 wherein the collecting of the data comprises intercepting one or more input-output requests comprising the respective portions of the data, and wherein the intercepting is executed in a virtualized environment.

7. The method of claim 6 wherein the intercepting of the one or more input-output requests is performed using one or more input-output filters.

8. The method of claim 6 wherein the virtualized environment comprises a hypervisor server.

9. The method of claim 1 wherein the one or more machine learning algorithms comprise a random forest machine learning algorithm.

10. The method of claim 9 wherein the predicting of the security levels of the respective portions of the data is performed using a plurality of decision trees and comprises averaging respective predicted security levels of respective ones of the plurality of decision trees.

11. The method of claim 1 wherein the implementing of security configurations comprises increasing a number of security layers for the respective portions of the data in the subset.

12. The method of claim 1 wherein the respective portions of the data in the subset meet a learned criticality criteria.

13. The method of claim 1 further comprising:
comparing the subset of the respective portions of the data to data portions whose security configurations have been previously implemented; and
determining that one or more of the respective portions of the data in the subset are similar to one or more of the data portions whose security configurations have been previously implemented;
wherein the implementation of the security configurations of the one or more of the respective portions of the data in the subset is based, at least in part, on the previous implementation of the security configurations of the one or more of the data portions.

14. An apparatus comprising:
a processing device operatively coupled to a memory and configured:
to collect data from one or more devices;
to generate a plurality of data object-based files corresponding to respective portions of the data, the plurality of data object-based files specifying one or more parameters of the respective portions of the data;
to predict security levels of the respective portions of the data using one or more machine learning algorithms;
to update the plurality of data object-based files to further specify one or more additional parameters of the respective portions of the data, wherein at least one additional parameter of the one or more additional parameters indicates the predicted security levels of the respective portions of the data; and
to implement security configurations for a subset of the respective portions of the data based, at least in part, on corresponding predicted security levels of the subset of the respective portions.

15. The apparatus of claim 14 wherein the one or more additional parameters further indicate at least one of locations of the respective portions of the data and whether the respective portions of the data belong to the subset.

16. An article of manufacture comprising a non-transitory processor-readable storage medium having stored therein program code of one or more software programs, wherein the program code when executed by at least one processing device causes said at least one processing device to perform the steps of:
collecting data from one or more devices;
generating a plurality of data object-based files corresponding to respective portions of the data, the plurality of data object-based files specifying one or more parameters of the respective portions of the data;
predicting security levels of the respective portions of the data using one or more machine learning algorithms;
updating the plurality of data object-based files to further specify one or more additional parameters of the respective portions of the data, wherein at least one additional parameter of the one or more additional parameters indicates the predicted security levels of the respective portions of the data; and
implementing security configurations for a subset of the respective portions of the data based, at least in part, on corresponding predicted security levels of the subset of the respective portions.

17. The article of manufacture of claim 16 wherein the one or more additional parameters further indicate at least one of locations of the respective portions of the data and whether the respective portions of the data belong to the subset.

18. The apparatus of claim 14 wherein the one or more parameters comprise at least one of file size, data type, last modification details and frequency of usage of the respective portions of the data.

19. The apparatus of claim 15 wherein the locations of the respective portions of the data correspond to positions of the respective portions of the data on an array.

20. The apparatus of claim 14 wherein the processing device is further configured:
to compare the subset of the respective portions of the data to data portions whose security configurations have been previously implemented; and
to determine that one or more of the respective portions of the data in the subset are similar to one or more of the data portions whose security configurations have been previously implemented;
wherein the implementation of the security configurations of the one or more of the respective portions of the data in the subset is based, at least in part, on the previous implementation of the security configurations of the one or more of the data portions.

* * * * *